(12) United States Patent
Jeffery

(10) Patent No.: US 6,925,964 B2
(45) Date of Patent: Aug. 9, 2005

(54) PET DRAIN AND CAPTURE DEVICE

(76) Inventor: Stephanie Jeffery, 489 Tuckerton Rd., Medford, NJ (US) 08055

( * ) Notice: Subject to any disclaimer, the term of this patent is extended or adjusted under 35 U.S.C. 154(b) by 0 days.

(21) Appl. No.: 10/372,422

(22) Filed: Feb. 24, 2003

(65) Prior Publication Data

US 2004/0163609 A1 Aug. 26, 2004

(51) Int. Cl.[7] ............................. A01K 13/00; E03C 1/26
(52) U.S. Cl. ................................ 119/673; 4/290; 4/292
(58) Field of Search ........................ 119/673, 753, 119/671; 4/290, 291, 286, 292, 287, 289, 295, 288, 293, 640, 650, 688, 651, 652, 680, 696, 695

(56) References Cited

U.S. PATENT DOCUMENTS

| | | | | |
|---|---|---|---|---|
| 228,091 A | * | 5/1880 | Lowell ........................ 210/459 |
| 765,131 A | * | 7/1904 | Croswell ........................ 4/652 |
| 1,370,088 A | * | 3/1921 | Chervin ........................ 4/514 |
| 1,442,361 A | * | 1/1923 | Renholdt ........................ 4/295 |
| 1,494,882 A | * | 5/1924 | Barger ........................ 4/292 |
| 1,544,430 A | * | 6/1925 | Brown ........................ 4/656 |
| 1,778,620 A | * | 10/1930 | Barta ........................ 4/651 |
| 2,689,017 A | * | 9/1954 | Schmid ........................ 210/164 |
| 3,742,524 A | * | 7/1973 | Ballentine ........................ 4/286 |
| 3,788,485 A | * | 1/1974 | Bruning ........................ 210/474 |
| 4,056,078 A | * | 11/1977 | Blafford et al. ........................ 119/671 |
| 4,207,632 A | * | 6/1980 | Savell et al. ........................ 4/288 |
| 4,316,433 A | * | 2/1982 | Hebert ........................ 119/673 |
| 4,671,976 A | * | 6/1987 | Vidal ........................ 428/41.8 |
| 5,078,862 A | * | 1/1992 | Justice ........................ 210/94 |
| 5,297,299 A | * | 3/1994 | Wilson ........................ 4/290 |
| 5,376,264 A | * | 12/1994 | Betancourt ........................ 210/166 |
| 5,542,377 A | * | 8/1996 | Gemill et al. ........................ 119/753 |
| 5,711,252 A | * | 1/1998 | Brandolino ........................ 119/673 |
| 5,715,547 A | * | 2/1998 | Becker et al. ........................ 4/619 |
| 5,794,570 A | | 8/1998 | Foster ........................ 119/756 |
| 5,974,601 A | | 11/1999 | Drane ........................ 4/539 |
| 6,088,844 A | | 7/2000 | Killham ........................ 4/295 |
| 6,173,455 B1 | * | 1/2001 | Nordstrom ........................ 4/292 |
| 6,202,749 B1 | * | 3/2001 | Adams et al. ........................ 166/227 |
| 6,336,231 B1 | | 1/2002 | Smith ........................ 4/580 |
| 6,338,171 B1 | | 1/2002 | Dandridge ........................ 4/657 |
| 6,341,704 B1 | | 1/2002 | Michel ........................ 211/181.1 |
| 6,427,259 B1 | * | 8/2002 | Cawthon ........................ 4/650 |
| 6,467,105 B1 | * | 10/2002 | Vanden Elzen ........................ 4/680 |
| 6,688,257 B2 | * | 2/2004 | Lee ........................ 119/671 |

* cited by examiner

Primary Examiner—Yvonne R. Abbott
(74) Attorney, Agent, or Firm—William L. Muckelroy; Art Lessler; Gary Lipson

(57) ABSTRACT

An apparatus (10) and a device (30) are provided for catching pet hair during the process of bathing a pet in a bathtub (12) or sink-like structure. Typically the apparatus (10) is comprised of a net (18) having a selected mesh size which is stretched over the bottom of the bathtub (12) and held in place with hooks (26) attached to the bottom of the bathtub 12 via integral suction cups (24). The device (30) combines functional features of the apparatus (10) into a screen (38) for catching pet hair which is held rigid in a frame (32) made of a pliable material which engages and grips the bottom of the bathtub (12) and allows water to drain out to the drain (22) of the bathtub (12).

5 Claims, 1 Drawing Sheet

PET DRAIN AND CAPTURE DEVICE

PRIORITY DATE CLAIMED

None

1. Field of the Invention

This invention relates generally to a small animal washing or bathing apparatus designed for home use, and more particularly, to an improved user friendly elevated washing container assembly specifically adapted for use in a home bathtub or shower stall for bathing small common household pets, such as small dogs. In even greater particularity, the present invention relates to an improved pet friendly washing container that is specifically designed to be easily cleaned and stored in a minimum amount of time.

2. Description of Prior Art

In U.S. Pat. No. 5,974,601 issued to Drane et al. in 1999 a small pet washing container is provided having a small animal washing container assembly preferably adapted for bathing a small dog in a home bathtub or shower stall. The assembly includes a plastic container having foldable legs for raising it to a suitable height, which allows the person washing the pet to stand while administering the bath. Being able to stand while bathing the dog not only is convenient, but also allows the person to maintain better control of the dog and eliminates unnecessary knee and back pain.

In a preferred embodiment of this prior art the walls of the container are bowed outward in the middle providing more room for a small dog to easily turn around, yet provide confinement for an animal of predetermined size. A unique "V" or "U" shaped centralized drain and pet hair filter channel is preferably formed as an integral part of the container bottom which runs lengthwise preferably along the entire bottom of the container from one end to the other. The channel is designed for easy cleaning and removal of dog hair and includes a predetermined number and pattern of specifically sized drain holes to provide for continuous water removal and filtering of loose pet hair.

In U.S. Pat. No. 5,794,570 issued to Foster et al. there is disclosed a portable pet-grooming center consisting of a tub removably mounted on a pedestal. The tub can be fastened to the pedestal for grooming pets, then removed and the pedestal nested in the tub for storage or transport. A platform is provided for installation in the tub when grooming a smaller pet. One end of the tub has a U-shaped cut out and a small stairway is provided so that a larger pet can walk up the stairway and over the cut out into the tub. The tub slopes toward a drain at one end and a hose is connected to the drain. Preferred arrangements for releasably securing the tub to the pedestal include over center clamps and slide together brackets.

In the prior art U.S. Pat. No. 6,088,844 issued on Jul. 18, 2000 to Killham there is provided a drain stopper for not invoking as much fear in animals as do traditional holed drains when the animals are placed in a sink or tub for bathing. The drain stopper includes an outer housing that has a lower portion and a peripheral sidewall that extends from the lower portion. The outer housing is adapted for insertion in a drain hole. The peripheral sidewall of the outer housing has a plurality of slots extending through it. A lid is coupled to the outer housing. The lid has an upper surface, which is textured for helping reduce slipping of skin along the lid. A generally round screen portion is disposed between the lower portion of the outer housing and an inner sidewall of the lid.

Of remote relatedness is U.S. Pat. No. 6,336,231, which was issued to Smith on Jan. 8, 2002 for an inflatable liner for use with conventional bathtubs. This invention is adapted for use with infants, elderly, physically disabled, or other instances, e.g., pet animals, where a cushioned and/or sanitary bathing surface is desired. A battery-operated air pump is attached to the inflatable liner via small plastic tubes. The air pump is used to inflate the liner. This prior art invention also has an air trap valve to prevent over inflating. The inflatable liner is composed of separate air reservoir tubes that conform to the shape of the bathtub, surrounding the entire interior surface area of the bathtub. Once inflated, the actual tub itself provides the present invention with its shape and rigidity. A convenient drainage hole with cover is incorporated into the inflatable liner, which allows the user to drain water out of the invention and bathtub before the present invention is removed from the tub and stored. This liner is incapable of preventing animal hair from entering the drain of a sink or tub.

In the prior art, there is also U.S. Pat. No. 6,341,704 which issued on Jan. 29, 2002 to Michel, Jr. for a stiff wire rack for hanging in a laundry tub or sink and adjustable to accommodate tubs and sinks of various sizes. This rack is incapable of preventing animal hair from entering the drain of a sink or tub.

SUMMARY

The novel invention disclosed provides a device and method solution to two of the problems of hair shed by a pet during a bath, namely, (a) alleviating the clean-up necessary; and, (b) preventing clogging of the drain hole of a tub or sink. An expanse of screen, net, or fabric is attached and secured to the bottom of a tub or sink, wherein the expanse has a perimeter which surrounds the pet and strains pet hair from the bath, e.g., from a shower of water expressed from above the pet and used to wash and rinse the pet. Clean up is made easier by constructing the expanse from an inexpensive disposable fabric or netting. Clogging is prevented when an optionally re-usable device with a rigid frame is used and frictionally engaged with the bottom of the tub or sink by adapting the contacting surface of the rigid frame with a resilient gripping material.

OBJECTS OF THE INVENTION

It is a primary object of the present invention to eliminate clogging of a drain with pet hair during and after bathing a pet.

It is another object of the present invention to provide a means for catching pet hair washed from a pet during a shower bath.

It is yet another object of the present invention to provide a disposable means for catching pet hair during a shower bath.

It is still another object of the present invention to provide a re-usable and/or disposable means for catching pet hair during a shower bath and which is adapted to frictionally adhere to the bottom of a tub or sink.

It is an object of the invention for the unit to be entirely fashioned out of variously selected plastic screening, metal screening, fabric adapted for use as a screen, netting made of synthetic and/or natural fibers and sufficiently durable not to be torn by a pet's claws.

It is still yet an object of the invention to provide a pet hair catching aid, which is flexible enough to bend and frictionally engage the bottom of a tub or sink.

It is further contemplated that the flexible pet hair catching aid means is equipped with a drain means for allowing water beneath the netting or screen to flow out and that the screen or net is made of monofilament line to resist tearing by a pet's claws.

DRAWINGS

These and other features, aspects, and advantages of the present invention will become better understood with regard to the following description, appended claims, and accompanying drawings wherein:

FIG. 3b depicts a side view of the attachment component of the novel invention shown in FIG. 3a;

DESCRIPTION OF THE PREFERRED
EMBODIMENTS OF THE INVENTION

Figure 1:
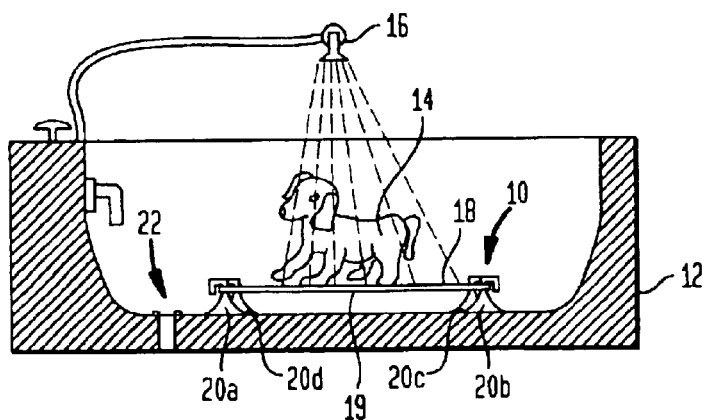
FIG. 1 is a partial cross-sectional view of a preferred embodiment of the invention shown in combination with a bathtub and overhead water faucet or shower.

Shown in FIG. 1 is a preferred embodiment of a novel pet drain and capture apparatus 10. In a bathtub 12 is shown a pet, for example a dog 14, being washed by means of a shower 16. The pet drain and capture apparatus 10 is attached to the bottom of the bathtub 12. The apparatus 10 comprises a disposable receptacle liner, for example, a net 18 with a perimeter or edge 19. The net 18 is rectangular in shape, for example. At a first point on the edge 19 of the net 18 there is a hook 20a. At a second point on the edge 19 of the net 18 there is a hook 20b. At a third point on the edge 19 of the net 18 there is a hook 20c. At a fourth point on the edge 19 of the net 18 there is a hook 20d.

The bathtub 12 has a drain 22. During the process of washing the dog 14 numerous strands of hair are dislodged. These dislodged strands of hair oftentimes cling and clump together and clog the drain of the bathtub 12.

The bathtub 12 has a drain 22. During the process of washing the dog 14 numerous strands of hair are dislodged. These dislodged strands of hair oftentimes cling and/or clump together to form plugs. A plug can obstruct or clog the drain of the bathtub 12. The novel apparatus 10 is deployed as shown in FIGS. 1 and 2 to capture these hair plugs before they become lodged in the drain 22 during the flow of any wash water carrying such plugs from the dog 14.

Figure 2:
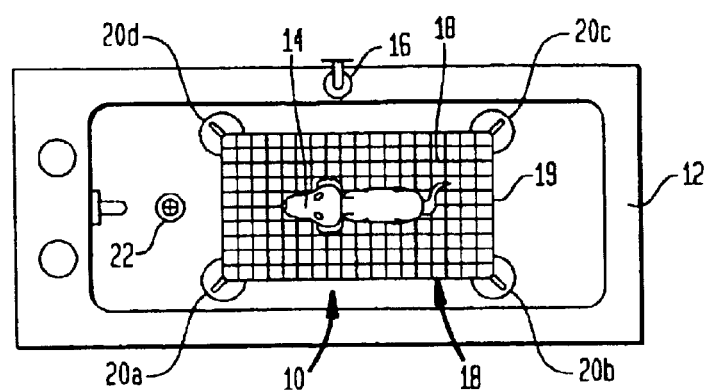
FIG. 2 illustrates a top or plan view of the novel invention previously shown in FIG. 1.
Figure 3A:
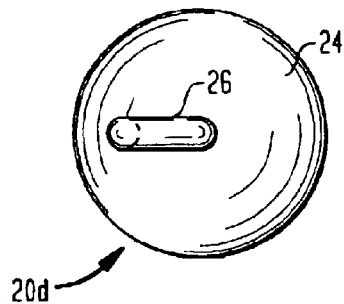
FIG. 3a depicts a plan view of an attachment component of the novel invention.
Figure 3B:
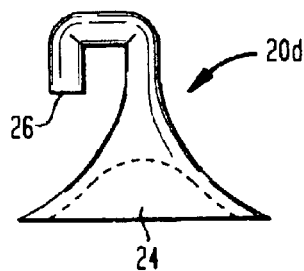
Figure 3C:
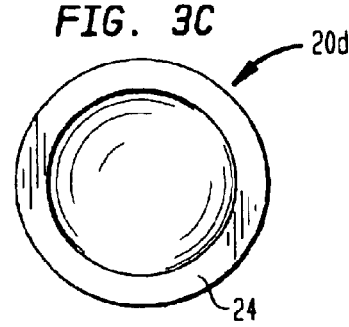
FIG. 3c shows a bottom view of the attachment component of the novel invention.

Non-permanent deployment of the apparatus 10 as shown in FIG. 2 is accomplished via the use of integral rubber-like suction cups 24 shown in detail in FIGS. 3a, 3b, and 3c as the base of each of the hooks 20a, 20b, 20c, and 20d.

There is shown in FIG. 3a a top view of the hook 20a with a hook member 26 integrally formed with a means, for example the suction cup 24, for attaching the hook 20a to the bathtub or washing receptacle. A side view of the hook 20a with hook member 26 and suction cup 24 is shown in FIG. 3b. FIG. 3c is a bottom view of the hook 20a. The suction cup 24 is integrally attached. Notwithstanding that the hook 20a being specifically featured in FIGS. 3a, 3b, and 3c, hooks 20a, 20b, 20c, and 20d are replicas of each other.

Moreover, the actual product produced for sale in accordance with this specification of the novel invention provides at least six of the hooks 20a in combination with a selected plurality of the disposable liners in a reusable plastic box.

The disposable nets 18 may be a highly porous, loosely knit synthetic cloth forming a course mesh in the case of a longhaired pet. For long haired pets, for example those having hairs at least about 2.5 centimeters long, the mesh should be at least about size 40 or less. For shorthaired pets, for example those having hairs less than about 2.5 centimeters long, the mesh should be at least about size 40 or more. For pets with extremely short hair, for example those having hairs less than about 1.0 centimeter long, the mesh size should be at least about size 90 or more. Thus, the inventor has discovered a direct correlation between the mesh size of the liner, the length of the hair of a pet being washed, and the effectiveness of the liner for catching and retaining hairs washed away when the pet is washed and rinsed. Hence, substantially all of the hairs from the washed pet can be prevented from entering the drain of the wash receptacle by selecting a relatively smaller mesh opening for short hair pets and by selecting a relatively larger mesh opening for long hair pets.

Figure 4:
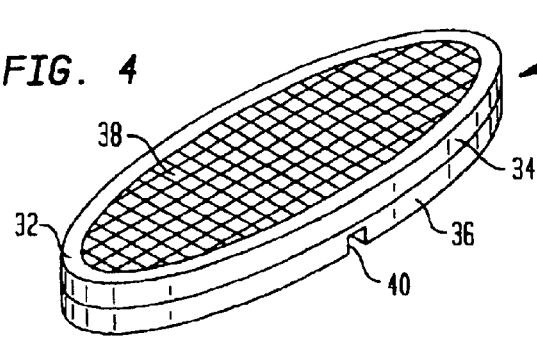
FIG. 4 is a perspective view of a unitary resilient alternative embodiment of the novel invention.

Referring to FIG. 4, there is shown an alternative embodiment of the novel invention, namely a rubberized integrated drain capture device 30. The device 30 has an oblong, rounded-edged rectangular or oval frame 32. The frame 32 has an upper part 34 fused to a lower part 36 made of a resilient material, for example, synthetic rubber, plastic, or nylon, selected for pliability and to frictionally engage the surface of the bottom of the bathtub 12. Fused in between the upper part 34 and the lower part 36 is an integrated netting or screen 38 having a mesh size from about 8 to 16, for example. The device 30 when fabricated forms a one-piece structure that is placed in the bathtub 12 (or sink).

The lower resilient part 36 has at least one drain aperture 40. The aperture 40 allows pet wash water filtered thru the device 30 to flow out.

The novel invention specified herein may be embodied in several equivalent forms by one of ordinary skill in the art without departing from the spirit or essential characteristics thereof. The present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, equals and intended to be embraced by those claims.

Parts List drain and capture apparatus 10
bathtub 12
dog 14
shower 16
net 18
edge 19
hook 20a
hook 20b
hook 20c
hook 20d
drain 22
suction cups 24
hook member 26
capture device 30
frame 32
upper part 34 lower part 36
screen 38
drain aperture 40

What is claimed is:

1. A re-usable pet washing apparatus, made of plastic or metal, for use in a bathing receptacle having a bottom with a drain therein, the apparatus comprising a porous substantially inflexible liner having a defined area and a perimeter for said area, the liner having its defined area and its perimeter fit inside the bottom of said receptacle, said liner covering the drain of said receptacle, a spacing means attached to an underside of said porous liner for spacing said porous liner from said bottom, the liner being a monofilament screen, the apparatus further comprising a frame for said liner wherein the frame comprises an engaging and grappling means attached to an underside of said liner for frictionally engaging the liner to the bottom of said receptacle and grappling the bottom of said receptacle whereby hair shed from a pet situated on said liner while the pet is being washed, showered, or rinsed with water is substantially trapped in said liner instead of in said drain.

2. The re-usable pet washing apparatus of claim 1 wherein said grappling means is a resilient member.

3. The re-usable pet washing apparatus of claim 1 wherein said spacing means is a member made of a resilient material.

4. The re-usable pet washing apparatus of claim 1 wherein the apparatus is a one-piece structure.

5. The re-usable pet washing apparatus of claim 1 wherein the monofilament screen has a mesh size that ranges from about 40 mesh to about 90 mesh.

* * * * *